United States Patent
Torbey

(10) Patent No.: US 11,314,895 B2
(45) Date of Patent: Apr. 26, 2022

(54) PRIVACY PRESERVING DATA COLLECTION AND ANALYSIS

(71) Applicant: Google LLC, Mountain View, CA (US)

(72) Inventor: Sami Torbey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 16/661,568

(22) Filed: Oct. 23, 2019

(65) Prior Publication Data

US 2020/0349277 A1 Nov. 5, 2020

Related U.S. Application Data

(63) Continuation of application No. PCT/US2019/030234, filed on May 1, 2019.

(51) Int. Cl.
| | |
|---|---|
| G06F 7/04 | (2006.01) |
| H04N 7/16 | (2011.01) |
| G06F 21/62 | (2013.01) |
| G06F 16/901 | (2019.01) |
| G06F 17/18 | (2006.01) |

(52) U.S. Cl.
CPC ........ *G06F 21/6245* (2013.01); *G06F 16/901* (2019.01); *G06F 17/18* (2013.01)

(58) Field of Classification Search
CPC .... G06F 21/6245; G06F 16/901; G06F 17/18; G06F 21/6254
See application file for complete search history.

(56) References Cited

U.S. PATENT DOCUMENTS

| | | | |
|---|---|---|---|
| 10,108,817 B2 | 10/2018 | Riva et al. | |
| 2005/0021488 A1 | 1/2005 | Agrawal et al. | |
| 2010/0070514 A1* | 3/2010 | Woodruff | G06F 16/9014 707/754 |
| 2014/0041047 A1* | 2/2014 | Jaye | G06F 21/6263 726/27 |
| 2014/0351260 A1* | 11/2014 | Sundaram | G06F 21/00 707/741 |
| 2016/0048868 A1* | 2/2016 | Mirisola | G06Q 30/0245 705/14.44 |
| 2016/0283600 A1 | 9/2016 | Ackerly | |

(Continued)

OTHER PUBLICATIONS

PCT International Search Report and Written Opinion in International Application No. PCT/US2019/030234, dated Jan. 31, 2019, 13 pages.

(Continued)

*Primary Examiner* — Trong H Nguyen

(74) *Attorney, Agent, or Firm* — Fish & Richardson P.C.

(57) ABSTRACT

Methods, systems, and apparatus, including computer programs encoded on a computer storage medium, for preserving user privacy when collecting and analyzing user data. Methods include discarding user data after generating a privacy enhanced representation of user data and storing this privacy enhanced representation in a probabilistic data structure. Methods further preserve user privacy by inserting false negatives in the probabilistic data structure. Methods also include storing continuous value attributes in the data structure. Methods include storing date values associated with one or more user attributes. The date values may specify the date when one or more user attributes was last received.

21 Claims, 5 Drawing Sheets

(56) References Cited

U.S. PATENT DOCUMENTS

2016/0378796 A1* 12/2016 Hopcroft ............... G06F 16/316
                                                         707/692
2018/0089497 A1*  3/2018 Romanenko ....... G06K 9/00221

OTHER PUBLICATIONS

Das et al., "LINKTIMITE: User Privacy-Preserved Social Network using SPFM Protocol" Journal of Network Communications and Emerging Technologies, Mar. 2018, 12 pages.
International Preliminary Report on Patentability in International Appln. No. PCT/US2019/030234, dated Nov. 2, 2021, 6 pages.

* cited by examiner

PRIVACY PRESERVING DATA COLLECTION AND ANALYSIS

CROSS-REFERENCE TO RELATED APPLICATION

This application is a continuation of PCT Application No. PCT/US2019/030234, filed May 1, 2019, the contents of which are herein incorporated by reference.

BACKGROUND

This specification relates to data processing and preserving user privacy when collecting and analyzing user data.

The Internet facilitates exchange of information and transactions between users and providers across the globe. Providers may make content (e.g., news articles, audio, etc.), products (e.g., consumer goods), and/or services (e.g., advertising services) available over the Internet, which users may access and/or purchase. Through these interactions, providers may receive significant amount of user data (assuming that the users consent to such data collection). Examples of the types of user data that providers may collect include, but are not limited to, the user's location, the types of content that the user accesses, the types of products and/or services that the user purchases, the date the user last accessed the provider's website, and the amount that the user spent on the provider's products.

Collecting and analyzing such user data can be beneficial to providers. In some cases, providers can aggregate data for multiple users to, for example, improve the provider's operations and/or improve user experience. For example, providers may aggregate the data for multiple users visiting the provider's website to identify and drop the least purchased products available from the provider's website. As another example, providers that provide advertising services may use the user data to determine effectiveness of particular advertising campaigns or to select content that is of most interest to the users.

SUMMARY

In general, one innovative aspect of the subject matter described in this specification can be embodied in methods including the operations of receiving, by a data processing apparatus and from a client device, user data specifying one or more attributes of a user; generating, by the data processing apparatus, a unique entry for the user using the user data and a user identifier unique to the user; inserting, by the data processing apparatus, a privacy enhanced representation of the unique entry into a probabilistic data structure that includes a plurality of privacy enhanced representations of unique entries for a plurality of users, including: generating, by the data processing apparatus, a hash representation of the unique entry; updating, by the data processing apparatus, the probabilistic data structure based on the hash representation; discarding, by the data processing apparatus, the user data after inserting the privacy enhanced representation of the unique entry into the probabilistic data structure; receiving a query requesting a response specifying how many users have an attribute that matches a given attribute specified in the query; obtaining, by the data processing apparatus and using the probabilistic data structure, a first number of users that includes both an estimated number of users that match the given attribute and false positives returned from the probabilistic data structure; and determining, by the data processing apparatus, the estimated number of users based on the first number of users and a false positive rate of the probabilistic data structure. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can include obtaining, by the data processing apparatus, a false negative rate; determining, by the data processing apparatus, that the unique entry is to be inserted into the probabilistic data structure based on the false negative rate; wherein inserting, by the data processing apparatus, a privacy enhanced representation of the unique entry into a probabilistic data structure that includes a plurality of privacy enhanced representations of unique entries for a plurality of users, including generating the hash representation of the unique entry and updating the probabilistic data structure based on the hash representation only in response to determining that the unique entry is to be inserted into the probabilistic data structure based on the false negative rate; and wherein determining, by the data processing apparatus, the estimated number of users based on the first number of users and a false positive rate of the probabilistic data structure, including scaling, by data processing apparatus, the estimated number of users based on the false negative rate to obtain a scaled estimated number of users.

Methods can include identifying, at random and using a specified percentage, one or more locations of the probabilistic data structure; updating values of the one or more locations of the probabilistic data structure; and scaling the scaled estimated number of users based on a number of the one or more locations.

Methods can include receiving, by a data processing apparatus and from a client device, user data specifying one or more attributes of a user, wherein the one or more attributes comprises a continuous value attribute that includes values ranging from a minimum value to a maximum value; generating, by the data processing apparatus, a normalized probability for a value of the continuous value attribute that is proportional to the maximum value; determining, by the data processing apparatus, that the unique entry is to be inserted into the probabilistic data structure based on the normalized probability; wherein inserting, by the data processing apparatus, a privacy enhanced representation of the unique entry into a probabilistic data structure that includes a plurality of privacy enhanced representations of unique entries for a plurality of users, including generating the hash representation of the unique entry and updating the probabilistic data structure based on the hash representation only in response to determining that the unique entry is to be inserted into the probabilistic data structure based on the normalized probability; and receiving a query requesting an aggregate value of a continuous value attribute specified in the query; determining, by the data processing apparatus and using the probabilistic data structure, the aggregate value of the continuous value attribute based on the estimated number of users and maximum value.

Determining, by the data processing apparatus and using the probabilistic data structure, the aggregate value of the continuous value attribute based on the estimated number of inserted users and maximum value, includes scaling the estimated number of inserted users using the maximum value to generate the aggregate value of the continuous value attribute.

Methods can include determining, by the data processing apparatus, the date of receipt of the user data specifying one or more attributes of the user; adjusting, by the data processing apparatus, the data updated in the probabilistic data structure using data specifying the date of receipt of the user data; receiving a query requesting a response specifying how many users have an attribute that matches a given attribute within a specified period; determining, using the probabilistic data structure, the dates of receipt of the given attribute for the estimated number of users; and identifying a number of users among the estimated number of users for which the respective date of receipt is within the specified period.

Methods can include discarding, by the data processing apparatus, data in the probabilistic data structure that is older than a predetermined period.

Methods can include identifying, at random and using a specified percentage, one or more locations of the probabilistic data structure; updating values of the one or more locations of the probabilistic data structure; and scaling the scaled estimated number of users based on a number of the one or more locations.

As noted above, collecting and analyzing user data can be beneficial for providers. However, providers may generally not be able to retain the data in a form sufficient to perform their analyses while providing sufficient privacy protection. This specification discusses various techniques and systems for preserving user privacy with respect to data collected from users, while still maintaining the data in a form that allows providers to perform the analyses that are used to improve the providers' content offerings and/or providing a customized user experience.

Particular embodiments of the subject matter described in this specification can be implemented to realize one or more of the following advantages. For example, the innovations described in this specification reduce the privacy risks associated with storing raw user data (e.g., data leaks or unauthorized access to user data). Conventionally, a provider may store user data in its raw form, but such raw data storage is susceptible to unauthorized access. For instance, if a malicious party gains access to the provider's systems, the raw user data stored in these systems may be readily accessible. The innovations described in this specification reduce this risk by inserting a privacy-enhanced representation of the user data, such as a hash representation of the user data, into a probabilistic data structure that further masks the user data. More specifically, the combination of using hashed representations of the user data in combination with a probabilistic data structure not only masks the data itself (e.g., using the hash representation rather than the actual user data), but also masks the number of users that have a specific set of user data. This is because probabilistic data structures, upon being queried, may identify a number of entries that actually match the query (i.e., true positives) as well as entries that do not match the query (i.e., false positives). Thus, even if a malicious party can access the probabilistic data structure, the malicious party cannot discern with any certainty the user data stored in this data structure, or even the actual number of users that have a specified combination of user attributes. This is because the probabilistic data structure reveals the likelihood or probability that certain user data is present in the probabilistic data structure.

On the other hand, the likelihood or probability that certain user data is present in the probabilistic data structure may be sufficient for a provider to perform its analysis. For example, for a probabilistic data structure that stores users' visits to a particular store, a provider does not know which entries correspond to a particular user. However, the provider can estimate, using the probabilistic data structure, the number of times that users visited the store. Furthermore, because the probabilistic data structure allows the provider to analyze the user data, the provider does not need to store the user data in its raw format, thereby further reducing the likelihood of a data leak revealing the user data. Relatedly, the innovations described in this specification allow significant resource savings (e.g., reduced utilization of data processing resources and/or memory resources) by allowing the provider to discard raw user data (which can consume significant amount of resources) and instead store a privacy-enhanced representation of this data in the probabilistic data structure, which requires much fewer resources.

The innovations described in this specification also allow inserting false negatives into probabilistic data structures. As used throughout this document, false negatives in the context of probabilistic data structures refers to a query of the probabilistic data structure that does not output one or more matching entries, when in fact the probabilistic data structure does include such matching entries. Conventionally, most types of probabilistic data structures do not generate any false negatives. As a result, a malicious party may be able to query the conventional probabilistic data structure to determine with certainty that a particular user is not among the users that have certain attributes. As such, the malicious party may be able to implicitly determine information about a user based on information obtained from a conventional probabilistic data structure. For example, a malicious party may query the conventional probabilistic data structure and be able to determine that user A did not buy a security system from the only store, store B, that sells security systems in a particular geographical region. The innovations described in this specification enable insertion of false negatives into the probabilistic data structure and thus, can thwart attempts by the malicious party to determine information about a user that could otherwise be obtained from conventional probabilistic data structures. The providers, on the other hand, are aware of the false negative rate and can scale the output of the probabilistic data structure to determine the true number of users with one or more particular attributes, while still providing the enhanced privacy protections achieved by way of the false negatives.

Moreover, although conventional probabilistic data structures may store binary data (i.e., 1s and 0s), the innovations described in this specification facilitate storing non-binary information in the probabilistic data structure. This enables storing richer data in the probabilistic data structure than the data stored in conventional probabilistic data structures. Examples of the types of non-binary information that may be stored in the probabilistic data structure include continuous values and dates.

The techniques described in this specification allow memory efficient storing of continuous values, which conventionally can take up a large amount of storage space, using a probabilistic data structure, thereby reducing the amount of storage space required to store the continuous values. Storing such continuous values in the probabilistic data structures allows providers to perform more sophisticated analysis than the analysis that is possible using conventional probabilistic data structures. For example, rather than just determining how many users shopped at a particular store, storing continuous values may allow providers to determine how much money was spent by all these users at a particular store.

The techniques described in this specification also allow storing dates in the probabilistic data structure. This technique is advantageous when a new data point needs to be collected on a regular basis while the other attributes for the user remain relatively constant. This technique also efficiently manages the finite space of the probabilistic data structure, which conventionally can become fully committed by repeated insertion of a large volume of user data. To efficiently manage the finite space of the probabilistic data structure, the probabilistic data structure may store the date when the user data was last updated. Thus, data older than a certain predefined period may be removed from the data structure. Moreover, storing date information in probabilistic data structures allows providers to perform more sophisticated analysis, such as determining current user trends and demands. For example, without date information, the provider may infer that product A is very popular because it was purchased by 100 users. However, with date information, the provider may further discern that product A is not that popular because only two users have purchased product A in the last six months.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
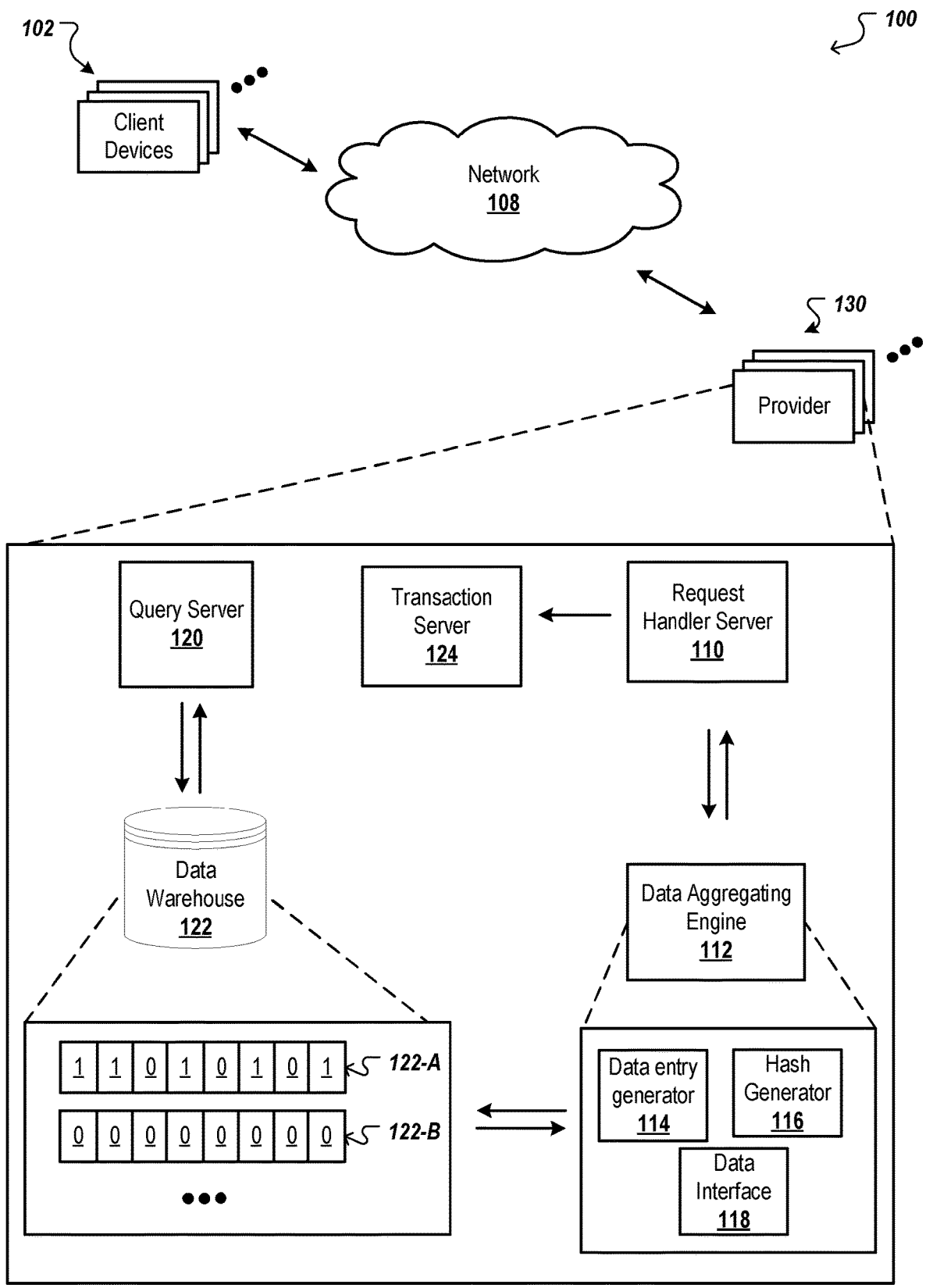
FIG. 1 is a block diagram of an example environment in which information is exchanged between client devices and providers.

This disclosure relates to computer implemented methods and systems that preserve user privacy when collecting and analyzing user data.

Through the exchange of information and transaction between users and providers, providers may receive significant amount of user data, such as, for example, the types of content that the user accesses, when the user last accessed the provider's website, and the amount that the user spent on the provider's products. If users allow the provider to collect such user data, the providers can analyze this data to improve the provider's operations and/or improve user experience. For example, providers may use user data to identify the most viewed and/or purchased products while dropping products that are not regularly viewed or do not generate revenue for the provider.

As described below and in greater detail throughout this specification, providers can preserve user privacy with respect to data collected from users, while maintaining the data in a form that allows providers to perform analyses on the user data.

Upon receiving user data specifying one or more attributes, the provider generates a privacy-enhanced representations of the user data using, for example, one or more hash functions. The provider stores the privacy-enhanced representation of the user data in a probabilistic data structure. The provider may then discard the user data, thereby preventing direct access to that data even if an unauthorized third party gained access to the system.

Subsequently, the provider may query the probabilistic data structure to estimate the actual number of users that have an attribute that matches a given attribute specified in the query. In response, the probabilistic data structure identifies the number of users that match the given attribute. This number represents the actual number of users that have the given attribute as well as a number of false positives identified by the probabilistic data structure. To identify the actual number of users that have the given attribute, the provider can scale the number of users using the false positive rate of the probabilistic data structure. As used throughout this document, the phrase false positive rate refers to a value that identifies the expected rate or number of false positives associated with a probabilistic data structure. The false positive rate may be, for example, a function of the number of items inserted into the probabilistic data structure and the size of the probabilistic data structure.

In some implementations, false negatives may be inserted into the probabilistic data structure by dropping some user data entries. This may be accomplished by establishing a false negative rate and then discarding user data entries based on the false negative rate. As used throughout this document, the phrase false negative rate refers to a value that identifies the rate of false negatives associated with data in a probabilistic data structure. The false negative rate can be specified or determined (as described further below). For example, if the false negative rate is 40% and if 10 user data entries are to be inserted into the probabilistic data structure, 40% of the ten entries (i.e., four entries) are discarded, while the remaining entries (10−4=6 entries) are inserted into the probabilistic data structure. In a subsequent query, the provider may be able to determine the actual number of users with a given attribute by scaling the number of users returned by the probabilistic data structure based on both the false positive rate and the false negative rate.

In some implementations, the probabilistic data structure may also store more than binary information (i.e., 0s and 1s) and in particular, the probabilistic data structure may store continuous values. For example, the probabilistic data may store the revenue per transaction ranging from $0 to $1000 at a particular store Store A. The provider may receive user data where one or more attributes is/are measured using continuous values (such as transaction revenue in the above example). The provider may generate a normalized probability for this attribute by dividing the continuous value by the maximum possible value of the attribute. In the above example, if there are 10 transactions at store A of $400 each (totaling $4000), the normalized probability is 400/1000, which is 0.4 or 40%.

As described above (and in greater detail below), the provider generates a privacy enhanced representation of the user data and updates the probabilistic data structure using this privacy enhanced representation. Rather than inserting each of the 10 transactions into the probabilistic data structure, the number of entries inserted into the probabilistic data structure is scaled by the normalized probability. Thus, using the above example, only 40% of the ten entries, i.e., four entries, are inserted into the probabilistic data structure.

In a subsequent query, the provider may be able to determine the total amount of the continuous value attribute for all the privacy enhanced user data stored in the probabilistic data structure. To accomplish this, the provider first estimates the actual number of users with a given attribute (e.g., the particular store where users spent money) by obtaining the number of users returned by the probabilistic data structure having the given attribute and then scaling this number using the false positive rate. The provider then scales the actual number of users by the maximum value (e.g., by multiplying the actual number of users by the maximum value). Using the above example, the provider may query the probabilistic data structure to obtain four entries. The number of entries (four) is then multiplied by the maximum value of $1000 to obtain the total amount of $4000.

In some implementations, the provider may store in the probabilistic data structure the date when an entry in the probabilistic data structure was last updated. As described above (and in greater detail below), the provider generates a privacy enhanced representation of the user data and updates the probabilistic data structure using this privacy enhanced representation. Rather than insert a binary value into the data structure at the appropriate locations, the provider inserts the date. Subsequently, based on the dates stored in the probabilistic data structure, the provider may perform garbage collection by removing data from the probabilistic data structure that is older than a certain period. The provider may also query the probabilistic data structure to identify the number of users with one or more attributes in a specified period.

These features and additional features are described in more detail below with reference to FIGS. 1-5.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 in which information is exchanged between client devices and providers. The example environment 100 includes a network 108, such as a local area network (LAN), a wide area network (WAN), the Internet, or a combination thereof. The network 108 connects providers 130 and client devices 102. The example environment 100 may include many different providers 130 and client devices 102.

A client device 102 is an electronic device that is capable of requesting and receiving content and resources over the network 108. Example client devices 102 include personal computers, mobile communication devices, digital assistant devices, and other devices that can send and receive data over the network 108. A client device 102 typically includes a user application, such as a web browser, to facilitate the sending and receiving of data over the network 108, but native applications executed by the client device 102 can also facilitate the sending and receiving of content over the network 108.

A client device 102 may exchange information with one or more providers 130. A provider 130 may be implemented as a data processing apparatus or as a computer system that is described with reference to FIG. 5, or any other appropriate processing system. In some implementations, the provider 130 includes a request handler 110, one or more response servers 118, a data aggregating engine 112, a data warehouse 122, and a query server 120.

As depicted in the block diagram of FIG. 1, the provider 130 is depicted as a single block with various sub-blocks. However, while the provider 130 could be a single device or single set of devices, this specification contemplates that the provider 130 could also be a group of devices, or even multiple different systems that communicate in order to provide content, products, and/or service to client devices and to collect and aggregate information. For example, the provider could encompass one or more of a search system, a video streaming service, an audio streaming service, a navigation service, an advertising service, or any other service. Moreover, one or more components of the provider or operations performed by these components may be performed by one or more components that are included with the client device. For example, components of the provider 130, such as the data entry generator 114 and the hash generator 116 (which are further described below) may be located at the client device 102 and thus, their respective operations (which are also described below) may be performed by the client device 130, instead of the provider 130.

Providers may make content, services, and/or products available on the Internet, e.g., on the providers' websites or on third party websites. A client device 102 may request content, services, and/or products. The provider 130 may receive this request on its website, which it may transmit to the request handler server 110 of the provider 130. Alternatively, the request may be routed directly to the request handler server 110 of the provider 130 from one or more third parties that received the request from client device 102.

The request handler server 110 analyzes the received request to determine the type of response to provide to the client device 102. For example, the request handler server 110 may receive a user request from a client device 102 to purchase one of the products listed on the provider's website. The request handler server 110 may parse the user request to identify the appropriate attributes and then send these attributes to the transaction server 124.

The types of attributes that may be identified from the user request include discrete data about the user that the provider may need to respond to the user's request as well as data the provider may want to analyze and aggregate. These may include, among others, the product/service name, product/service identifier, unique identifier assigned to the user, geographic information (e.g., region where request was submitted, network location, user address, zip code), a name (or network location) of the requesting device (e.g., the client device 102), the cost of the product/service/content purchased, the day of the transaction, and the location of the provider from which the product/service is requested (e.g., the website through which the request was received). The attributes may also include information that may be used for debugging purposes, such as process name, version numbers, etc.

In the above example, the request handler server 110 identifies attributes such as the user identifier, the product identifier, shipping speed, the shipping information, the purchase price of the product, the shipping cost, and the website where the request originated (e.g., in the case where the provider may operate more than one website).

In response to receiving the attributes from the request handler server 110, the transaction server 124 may execute a transaction based on the received attributes. In the above example, the transaction server 124 may determine a total cost for the product including the shipping cost and the purchase price of the product. The transaction server 124 schedules the shipping for the product at the received shipping address and at the desired shipping speed. Once scheduled, the transaction server 124 may send a notification to a shipping center to pickup the product. In parallel, the transaction server 124 may send a notification to the user, confirming that the transaction was successful and that the user's order is confirmed.

The user may allow the provider 130 to collect data with respect to this transaction. The user may allow such data collection by opting into the provider's data collection policy, which may be provided to the user at the outset of the user's relationship with the provider 130, e.g., at the time when the user signs up as a member for the provider's website. Alternatively, the user may be expressly asked for permission for such data collection during the transaction. For example, the transaction server 118 may include in the notification to the user of the client device 102, a request to collect the user data specific to the present transaction. The user may confirm that the provider 130 may collect the transaction specific information.

If the user allows the provider 130 to collect its data with respect to this transaction, the request handler server 110 sends the identified attributes from the user request to the data aggregating engine 112. The data aggregating engine 112 generates and stores a privacy enhanced representation of the user data in one or more data structures (e.g., 122-A, 122-B) stored in the data warehouse 122 (as described further with reference to FIGS. 2 to 4).

Subsequently, the query server 120 may receive a query requesting certain information about the data stored in the data warehouse 122. For example, the query may request the number of users that purchased a particular product, Product A, from a particular website (Website B). The query server 120 may use the attributes <Product A> and <Website B> to query the appropriate data structure in the data warehouse to determine the query response. This response is then provided to the requestor via the query server 120. Additional details regarding the processing of queries is described further with reference to FIGS. 2 to 4.

Figure 2:
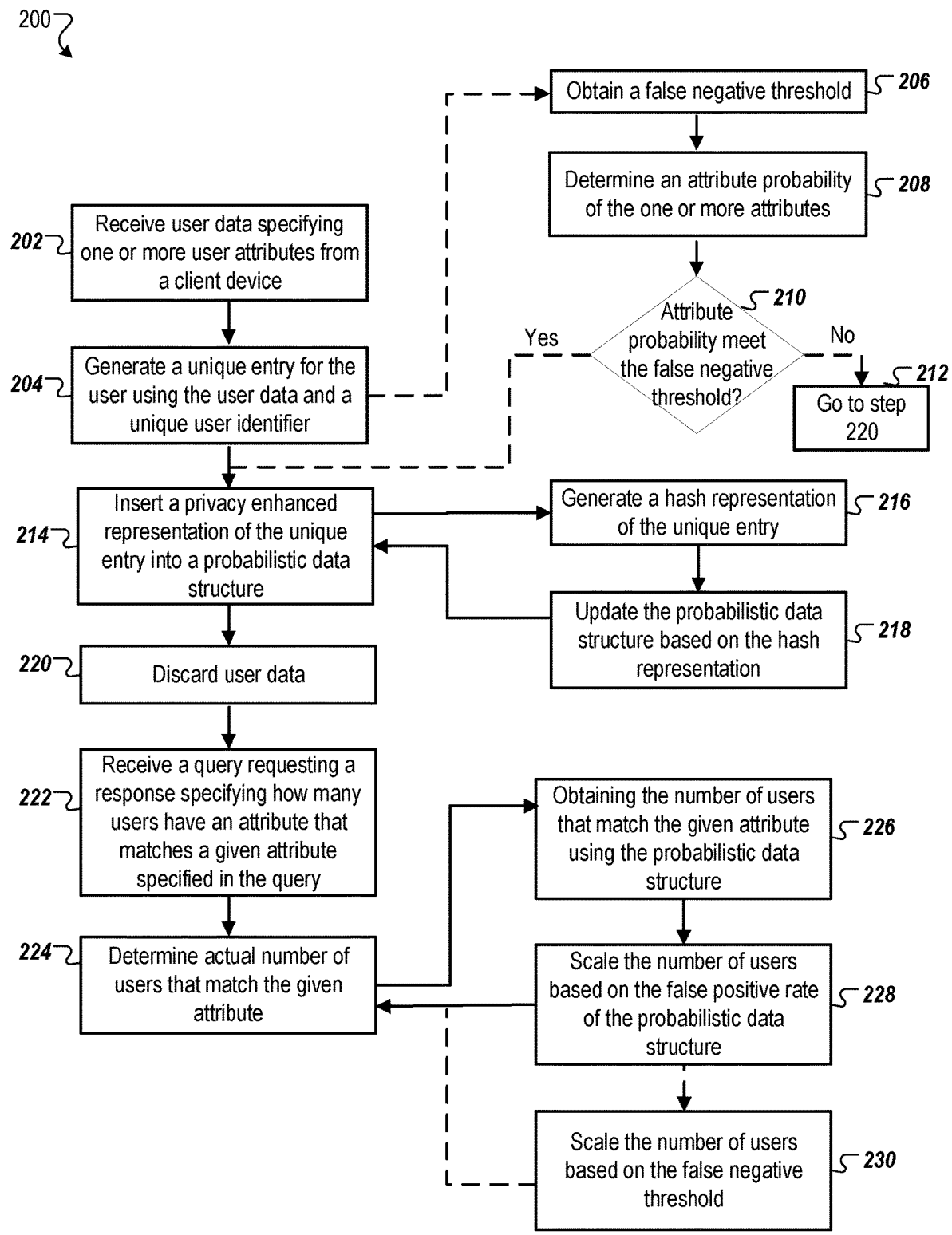
FIG. 2 is a flow diagram of an example process of storing and analyzing user data using a probabilistic data structure.

FIG. 2 is a flow chart of an example process 200 that describes storing and analyzing user data using a probabilistic data structure. The operations of the process 200 are described below for purposes of illustration only. The operations of the process 200 can be performed by any appropriate device or system, e.g., any appropriate data processing apparatus. The operations of the process 200 can also be implemented as instructions that are stored on a computer readable medium, which, when executed by one or more data processing apparatus, cause the one or more data processing apparatus to perform the operations of the process 200. The operation of the process 200 are described below with reference to the components of the provider 130. Moreover, the probabilistic data structure referenced in FIG. 2 may be a Bloom filter, but it may also be other types of probabilistic data structures, such as, for example, Hyper-LogLog and Count-Min sketch.

The provider 130 receives user data specifying one or more user attributes from a client device (at 202). For example, the request handler server 110 may receive a user request from a client device 102 to purchase one of the products, Product A, listed on one of the provider's websites, Website B. The request handler server 110 may parse the user request to identify the attributes in the user request. In some implementations, the request handler server 110 may use an existing list of attributes that it maintains to identify the same attributes in the user request. In this example, the attributes include product sales (with a value of Product A) and store (with a value of Website B).

In the above example, the request handler server 110 identifies attributes such as user identifier (e.g., a unique identifier assigned to each user who is a member of the provider's website), the product identifier (e.g., a unique identifier assigned to each of the provider's products), payment information, shipping speed, the shipping information, the purchase price of the product, the shipping cost, and the website where the request originated (e.g., in the case where the provider may operate more than one website). As described with reference to FIG. 1, the request handler server 110 may identify several other types of attributes. The request handler server 110 sends the identified attributes to the data aggregating engine 112.

The data aggregating engine 112, upon receiving the attributes, may select for storage only data for one or more attributes that are presently stored in the data warehouse 122. Alternatively, the data aggregating engine 112 may select for storage all the attributes received in the user request. If the attributes do not already include the user identifier (e.g., in the case where the user is a first time shopper on the provider's website), the data aggregating engine generates a unique identifier for the user. In the above example, the data aggregating engine may identify the following attributes for storage: the user identifier (943215), the product identifier (Product A), and the website where the request originated (Website B). Note that in this example, the user already had an existing unique user identifier. Alternatively, the data aggregating engine 112 may generate a unique identifier for the user using, for example, a random number generator.

The provider 130 generates a unique entry for the user using the user data and the unique user identifier (at 204). In some implementations, the data entry generator 114 generates a unique entry as a tuple with the following form: <User ID, Attribute 1, Attribute 2, . . . , Attribute n>. In the above example, the data entry generator 114 generates a tuple for the following attributes: user identifier (943215), the product identifier (Product A), and the website where the request originated (Website B). The generated tuple would thus be: <943215, Product A, Website B>. Generating a tuple is one of many ways of concatenating the user identifier and the one or more attributes. For example, another way of concatenating this information includes generating a hash representation for the user identifier and for each of the attributes, and then concatenating the hash representations of the user identifier and each of the attributes.

If the provider 130 desires to insert false negatives in the probabilistic data structure, then it obtains a false negative rate (at 206). For example, the data aggregating engine 112 may maintain design information for the probabilistic data structure, which may include individual false negative rates for each data structure stored in the data warehouse 122. Alternatively, the provider 130 may assign the same false negative rate for all probabilistic data structures stored in the data warehouse 122. In the above example, the false negative rate may be 25%.

The provider 130 discards user entries based on a false negative rate (at 208). For example, if the false negative rate is 25% and the provider is inserting 100 user entries, the provider 130 may generate unique entries for each of the user entries (for example, in the manner described above) and then drop 25% of these 100 user entries (i.e., 25 entries). The provider 130 retains (e.g., in a temporary storage) the remaining user entries, i.e., the non-discarded user entries.

The provider 130 determines whether the unique entry that is generated at operation 204 is among the non-discarded user entries (at 210). In some implementations, the provider 130 can compare the unique entry generated at operation 204 with the unique entries corresponding to the non-discarded user entries (at operation 208). If the provider 130 does not find a match based on this comparison (at 212), it determines that the unique entry generated at operation 204 is among the discarded entries and discards the unique entry and the corresponding user data at operation 220 (described below). On the other hand, if the provider 130 finds a match, the provider 130 can send a command to the data aggregating engine 112 to insert a privacy enhanced representation of the tuple into a probabilistic data structure stored in the data warehouse 122, as further described below with reference to operation 214.

Optionally, or in addition to using the false negative rate to discard certain user entries, a certain percentage (or number) of the locations of the probabilistic data structure can also be set at random to a value of 1.

The data aggregating engine 112 inserts the privacy enhanced representation of the unique entry into the probabilistic data structure (at 214) by generating a hash representation of the unique entry (at 216) and updating the probabilistic data structure based on the hash representation (at 218).

In some implementations, the data aggregating engine 112 can send a command along with the unique entry (generated at 204) to the hash generator 116 to generate the hash representation of the unique entry. The hash generator 116 may input the unique entry to one or more hash functions, each of which outputs a hash representation of the unique entry. The hash generator may use any available hash functions, such as, for example, SuperFastHash, CityHash, MurmurHash, SHA-256, and SpookyHash. For example, the hash generator 116 may use three hash functions (e.g., SuperFastHash, CityHash, and MurmurHash), each of which may generate a different hash value.

In some implementations, the hash generator 116 may send a message, including the unique identifier (e.g., the tuple <943215, Product A, Website B>) as well as the three hash values corresponding to the unique identifier to the data interface 118. The data interface 118 may maintain a list of all the data structures stored in the data warehouse 122. The data warehouse 122 may routinely communicate with the data interface 118 to provide the data interface 118 with an updated list of probabilistic data structures stored in the data warehouse 122. The data interface 118 uses this list as well as the received message from the hash generator 116 to identify the appropriate data structure that needs to be updated. In some implementations, the data interface 118 parses the attributes of the unique entry to identify the appropriate data structure. For example, for the tuple <943215, Product A, Website B>, the data interface may evaluate the attributes (Product A and Website B) to identify the appropriate data structure in its maintained list of data structures, that stores these attributes.

In some implementations, the data interface 118 can send a message, including the hash representation of the unique entry along with the data structure identifier corresponding to the data structure 122-A to be updated. Upon receiving this message, the data warehouse 122 updates the probabilistic data structure 122-A using the hash values in the message. In the above example, the data warehouse 122 uses the hash values to identify the appropriate locations in the data structure 122-A, and the data warehouse then updates the values at these locations from 0 to 1.

After inserting the privacy-enhanced representation of the unique entry into the probabilistic data structure, the provider 130 discards the user data (at 220). For example, after the data warehouse 122 confirms that the data structure 122-A was successfully updated (e.g., by sending an acknowledgement message to the data interface 118), the data aggregating engine 112 deletes the user data and the unique entry (i.e., the tuple including the user identifier and the one or more attributes), thereby preventing further access to the user data itself. The data aggregating engine 112 also sends a message to the request handler 110 to delete any instances of the user data that the request handler server 110 initially sent to the data aggregating engine 112. Alternatively or additionally, the data aggregating engine 112 may re-assign memory where user data is currently stored such that the re-assigned memory locations may be updated with other data.

The provider 130 generates or receives a query requesting a response specifying how many users have an attribute that matches a given attribute specified in the query (at 222). In some implementations, an administrator or an operator for the provider 130 may send a query to the query server 120. Using the above example, the query may be requesting a response specifying how many users in a set of users bought a particular product, Product A. In some implementations, the query may specify the set of users and their corresponding unique identifier. The query received by the query server 120 in this example may have the following format: get tot_users (product_sales→Product A; store→Website B; user_set={1231, 1232, 1233, . . . , 1299). As shown in this query, tot_users refers to the total number of users, "product_sales→Product A" refers to an attribute "product_sales" with a desired value of Product A, store→Website B" refers to a store attribute with a desired value of Website B, and user_set identifies the set of users to include as part of the query, which in this case includes users with unique identifiers ranging from 1231 to 1299. Alternatively, the query may not specify set of users, in which case the query server 120 includes all (or some subset, depending on the user identifiers represented by data in the appropriate data structure) stored user identifiers (e.g., which may be stored in a separate data structure in the data warehouse 122) as part of the query.

Queries need not be limited to number of users with particular attributes. For example, queries can also request information about particular attributes or behavior of the users based on the data stored in the probabilistic data structure. For example, a query can request the number of purchases made by an average user at a particular store. In this example, the same query as referenced in the previous paragraph may be executed, and the response may be scaled (e.g., divided) by the number of users for whom data is stored in the probabilistic data structure, to obtain the average purchases per user. As another example, a query can request the number of yellow pants purchased at a particular store. In this example, the query would specify all the users in the set and the attributes of product type=pants and color=yellow.

The query server 120 estimates the actual number of users that match the given attribute (at 224). To accomplish this, the query server 120 first obtains the number of users that match the given attribute using the appropriate probabilistic data structure (at 226). In some implementations, the query server 120 communicates with the data warehouse 122 to obtain data requested in the query. The data warehouse 122 may routinely communicate with the query server 120 to provide the query server 120 with a current list of probabilistic data structures stored in the data warehouse 122. The query server 120 uses this list as well as the received query to identify the appropriate data structure that needs to be updated. In some implementations, the query server 120 may parse the attributes specified in the query to identify the appropriate data structure. In the above example, the query server 120 uses the <product_sales> attribute to identify the data structure that includes this attribute, which in this example is data structure 122-A.

In some implementations, the query server 120 generates a tuple (or other appropriate concatenated data, as described above) for each unique user identifier in the set of users. The order of the user identifier and the attributes in the tuple for query purposes is the same as the order used to initially enter the user entries into the probabilistic data structure. For example, for user identifier 1231, the appropriate tuple would be <1231, Product A, Website B>. The query server 120 then generates hash representations (as described above) for each of the tuples and uses the resulting hash values as indices for the data structure 122-A. In this example, the query server 120 checks the value stored in bit locations or indices specified by the resulting hash values and maintains a count of all locations where the corresponding bit value is "1." The total number of locations with the bit value of "1" represents the number of users that match the given attribute using the appropriate probabilistic data structure. In this way, in the above example, the query server 120 may obtain a total number of users of 40 who purchased Product A from Website B.

The query server 120 scales the number of users determined at step 226 based on the false positive rate of the probabilistic data structure to estimate the actual number of users (i.e., the true positives in the probabilistic data structure) (at 228). In some implementations, the true positives can be estimated using the following formula: P−(FPR*TN)/(1−FPR), where P represents the value returned from querying the probabilistic data structure (as in preceding paragraph), FPR represents the false positive rate of the probabilistic data structure, and TN represents the true negatives (which can also be represented by the number of users minus P). In the above example, if the number of users whose data is stored in the probabilistic data structure is 100, then the true negatives TN is 60, i.e., 100 (total number of users)−40 (total number of users returned by querying the data structure). Using the above formula, and assuming a 20% false positive rate, the number of true positives=40−(20%*60)/(1−20%)=40−(12)/0.8=25. Thus, if the probabilistic data structure in this example does not include any false negatives, then the provider 130 determines an estimate of the actual number of users with attributes that match the given attribute (e.g., "Product A" and "Website B") is 25.

If, however, the probabilistic data structure includes false negatives, then the scaled value determined at operation 228 needs to be further scaled based on the false negative rate that was previously obtained at step 206. In the above example, the scaled number of users determined at step 228 is 25 and the false negative rate is 12%. Using the false negative rate of 12%, the query server 120 drops 12% of the users and stores the remaining 88% of users (i.e., 100%−12%). To accomplish this, the query server 120 adjusts the 25 users (determined at 228) by this number of users by 88%, to obtain 28.4 users. Therefore, 28.4 represents an estimate of actual number of users with the specified attribute that match the attribute identified in the query (which is "Product A" in this example).

If, in addition to using the false negative rate to discard certain user entries, a certain percentage of the locations of the probabilistic data structure are set to a value of 1, then the same percentage can be used to further scale, using this percentage, the actual number of user determined in the preceding paragraph, to obtain the actual number of users.

Figure 3:
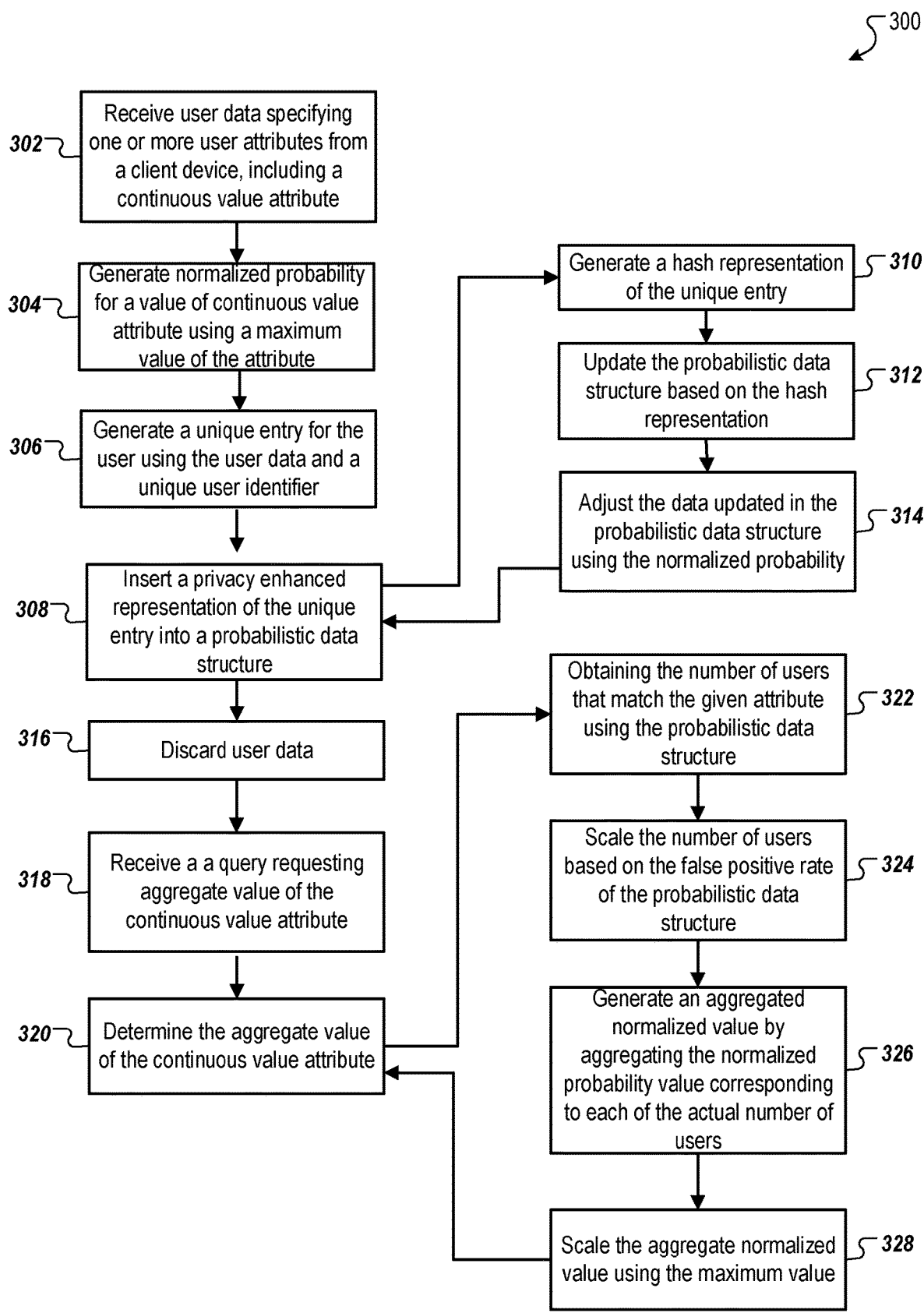
FIG. 3 is a flow diagram of an example process of storing and analyzing user data, which includes a continuous value attribute, using a probabilistic data structure.

FIG. 3 is a flow diagram of an example process 300 that describes storing and analyzing user data, which includes a continuous value attribute, using a probabilistic data structure. The operations of the process 300 are described below for purposes of illustration only. The operations of the process 300 can be performed by any appropriate device or system, e.g., any appropriate data processing apparatus. The operations of the process 300 can also be implemented as instructions that are stored on a computer readable medium, which, when executed by one or more data processing apparatus, cause the one or more data processing apparatus to perform the operations of the process 300. The operation of the process 300 are described below with reference to the components of the provider 130. Moreover, the probabilistic data structure referenced in FIG. 3 may be a Bloom filter, but it may also be other types of probabilistic data structures, such as, for example, HyperLogLog and Count-Min sketch.

The provider 130 receives user data specifying one or more user attributes from a client device, including a continuous value attribute (at 302). For example, the request handler server 110 may receive 10 user requests from one or more client devices 102 to purchase a particular product, Product A, which is listed for $400 on one of the provider's websites, Website B. The request handler server 110 may parse the user request to identify the attributes in the user request. In some implementations, the request handler server 110 may use an existing list of attributes that it maintains to identify the same attributes in the user request. In this example, the attributes include product sales (with a value of Product A), product price (which is a continuous value attribute with a value of 300), and store (with a value of Website B).

The provider 130 generates a normalized probability for a value of continuous value attribute using a maximum value of the attribute (at 304). For example, the provider 130 may determine by evaluating the product prices of all products listed on website B, that the product prices range from $0 to $1000. In this example, the maximum value for the product price attribute is 1000. The provider 130 normalizes continuous value of 400 using the maximum value of 1000 by dividing 400 by 1000. The resulting normalized probability is 40% or 0.4 (i.e., 400/1000).

The provider 130 generates a unique entry for the user using the user data and a unique user identifier (at 306). In some implementations, the data entry generator 114 generates a unique entry as a tuple (or other form of concatenated information as described above) with the following form: <User ID, Attribute 1, Attribute 2, . . . , Attribute n>. In the above example, the data entry generator 114 generates a tuple for the following attributes: user identifier (943215), the product identifier (Product A), and the website where the request originated (Website B). Thus, the tuple would be as follows: <943215, Product A, Website B>. Note that the data entry generator 114 does not include the continuous value attribute (which is product price in the above example) as part of the tuple.

The provider 130 inserts a privacy-enhanced representation of the unique entry into a probabilistic data structure (at 308). In some implementations, this may be performed in four steps.

First, the provider 130 identifies user entries based on the normalized probability (at 310). In the above example, the normalized probability is 40% and the number of entries to be inserted is 10. Accordingly, the provider 130 may generate unique entries for each of the user entries (as described above and with reference to FIG. 2) and then identify 40% of 10 user entries (i.e., 4 entries) to insert into the probabilistic data structure. The identified user entries may be stored in a temporary storage (e.g., a cache).

Second, the provider 130 determines whether the unique entry that is generated at operation 306 is among the identified user entries (at 310). In some implementations, the provider 130 can compare the unique entry generated at operation 306 with the unique entries identified at 310. If the provider 130 does not find a match based on this comparison (at 314), it determines that the unique entry generated at operation 306 is not among the identified entries and discards the unique entry and the corresponding user data at operation 316 (described below). On the other hand, if the provider 130 finds a match, the provider 130 can send a command to the data aggregating engine 112 to insert a privacy enhanced representation of the tuple into a probabilistic data structure stored in the data warehouse 122, as further described below with reference to operation 330.

Third, the provider 130 generates a hash representation of the unique entry (at 330), for example, as described with reference to the corresponding step of process 200. Next, the provider 130 updates the probabilistic data structure based on the hash representation (at 332), for example, as described with reference to the corresponding step of process 200. In the above example, and as described with reference to process 200, the hash functions generate three hash values for the tuple <943215, Product A, Website B>, which then results in setting the appropriate locations of the data structure 122-A based on the hash values, from 0 to 1.

After inserting the privacy enhanced representation of the unique entry into a probabilistic data structure, the provider 130 discards the user data (at 316) in the same way as described with reference to the corresponding step of process 200.

The query server 120 receives a query requesting the aggregate value of the continuous value attribute (at 318). In some implementations, a webmaster or operator for the provider 130 may send a query to the query server 120. Using the above example, the query may request a response specifying the total money spent by users on Product A at Website B. The query received by the query server 120 in this example may have the following format: get tot_revenue (product→Product A, store→Website B, user_set→{1231, 1232, 1233, . . . , 1299}). As shown in this query, tot_revenue refers to the total revenue or money spent, "product→Product A" refers to an attribute "product" with a desired value of Product A, "store→Website B" refers to an attribute "store" with a desired value of "Website B, and user_set={1231, 1232, 1233, . . . , 1299} identifies the set of users to include as part of the query, which in this case includes users with unique identifiers ranging from 1231 to 1299. Alternatively, the query may not specify set of users, in which case the query server 120 includes all (or some subset, depending on the user identifiers represented by data in the appropriate data structure) stored user identifiers (e.g., which may be stored in a separate data structure in the data warehouse 122) as part of the query.

The provider 130 determines the aggregate value of the continuous value attribute (at 320). In some implementations, this operation can include three steps. First, the provider 130 obtains the number of users that match the given attribute using the probabilistic data structure (at 322). This operation may be performed in a manner similar to that described with reference to the corresponding step of process 200.

Second, the provider 130 scales the number of users based on the false positive rate (and optionally the false negative rate) of the probabilistic data structure (at 324) in a manner similar to that described with reference to the corresponding step in process 200.

Third, the provider 130 scales the actual number of inserted users using the maximum value (at 328). In the above example, the provider 130 multiplies the estimate of the actual number of inserted users (i.e., the true positives obtained by querying the data structure and scaling using the false positive rate) by the maximum value. In the above example, the actual number of inserted users was 4, which when multiplied by the maximum value of 1000, results in total value of 4000 (i.e., 4*1000). Thus, $4000 represents the aggregate value of the continuous value attribute, which in this case, is the total revenue or total amount spent by users on Product A at Website B.

Figure 4:
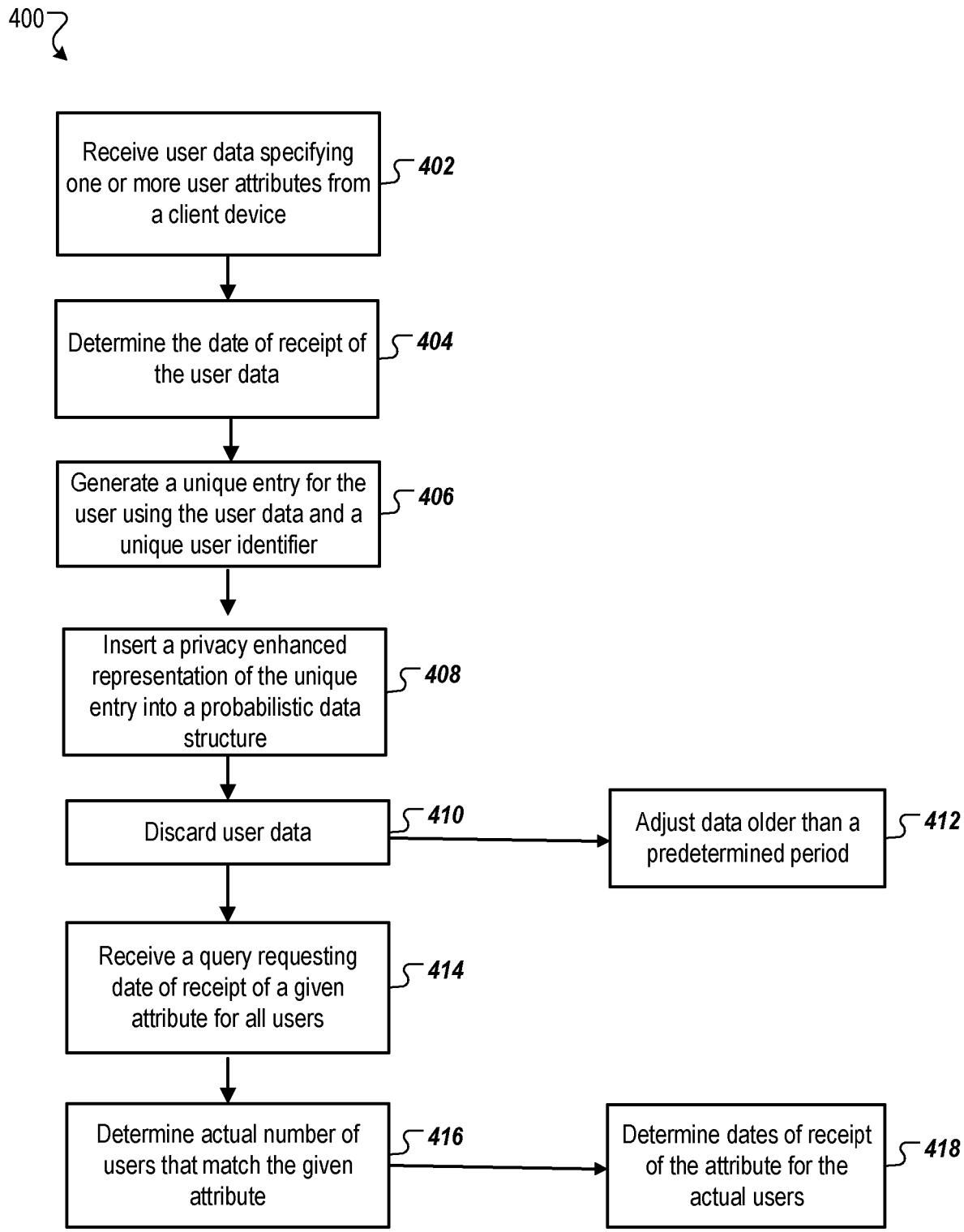
FIG. 4 is a flow diagram of an example process of storing and analyzing a date value in a probabilistic data structure.

FIG. 4 is a flow diagram of an example process 400 that describes storing and analyzing a date value in a probabilistic data structure. The operations of the process 400 are described below for purposes of illustration only. The operations of the process 400 can be performed by any appropriate device or system, e.g., any appropriate data processing apparatus. The operations of the process 400 can also be implemented as instructions that are stored on a computer readable medium, which, when executed by one or more data processing apparatus, cause the one or more data processing apparatus to perform the operations of the process 400. The operation of the process 400 are described below with reference to the components of the provider 130. Moreover, the probabilistic data structure referenced in FIG. 4 may be a Bloom filter, but it may also be other types of probabilistic data structures, such as, for example, HyperLogLog and Count-Min sketch.

The provider 130 receives user data specifying one or more user attributes from a client device (at 402) in a manner similar to that described with reference to the corresponding step of process 200.

The provider 130 determines the date of receipt of the user data (at 404). The data aggregating engine 112 may obtain the current date, for example, from the request handler server's timestamp. The data aggregating engine 112 may also obtain the current date from other sources, such as, for example, from the date field that may be sent along with the request received from the client device 102.

The provider 130 generates a unique entry for the user using the user data and a unique user identifier (at 406). This operation may be performed in a manner similar to that described with reference to the corresponding step of process 200.

The provider 130 inserts a privacy enhanced representation of the unique entry into a probabilistic data structure (at 408). This operation may be performed in a manner similar to that described with reference to the corresponding step of process 200, with one exception. Instead of updating the locations of the probabilistic data structure to "1," the locations are updated to the date value determined at step 404.

After inserting the privacy-enhanced representation of the unique entry into a probabilistic data structure, the provider 130 discards the user data (at 410). This operation is in the same way as described above with reference to the corresponding step of process 200.

The provider 130 adjusts data in the probabilistic data structure older than a predetermined period (at 412). In some implementations, the provider 130 discards user data older than a predetermined period, e.g., one day, one week, one year, or some other specified period (at 412). For example, the provider 130 may have an agent that routinely (e.g., at specified time intervals) checks whether the values stored in the probabilistic data structures in data warehouse 122, are more than seven days old. The provider 130 may use the present date to identify a date from seven days ago and then looks for all entries with a date earlier than that date. For those entries, the agent may change the values to 0.

The query server 120 receives a query requesting a response specifying how many users have an attribute that matches a given attribute specified in the query within a specified period (at 414). In some implementations, the administrator or operator for the provider 130 may send a query to the query server 120. Using the above example, the query may request a response specifying the number of users who purchased product A in the last 6 months. The query received by the query server 120 in this example may have the following format: get tot_users (product□Product A, time=<6, user_set={1231, 1232, . . . 12xx}). As shown in this query, tot_users refers to the total number of users, "product□Product A" refers to an attribute "product purchased" with a desired value of "Product A," "time=6" refers to an attribute "time" with a value of less than or equal to "6" (which in this case is 6 months), and a user_set identifies the users to include in this query.

The provider 130 estimates the actual number of users with attributes that match the attribute specified in the query (at 416). This operation may be performed in a manner similar to the corresponding step of process 200.

The provider 130 determines an estimate of the actual number of users that match the given attribute in the specified period (at 418). In some implementations, for each of the actual number of users estimated at step 416, the provider 130 first looks up the corresponding date value stored in the probabilistic data structure. In the above example where the query requests a number of users who purchased product A in the last 6 months, the query server 120 looks up the date values for all the actual users identified in step 416. The query server 120 may use the present date to identify a date 6 months before the present date. Thus, if the present date is Jan. 1, 2019, the query server 120 may determine Jul. 1, 2018 as the date from 6 months ago. Then, the query server 120 evaluates whether the date values for the actual users exceed Jul. 1, 2018 and keeps a count of entries with a corresponding date value after Jul. 1, 2018. The query server 120 adjusts this count to account for the false positive rate (and optionally the false negative rate) to estimate the number of users who purchased product A in the last 6 months.

Figure 5:
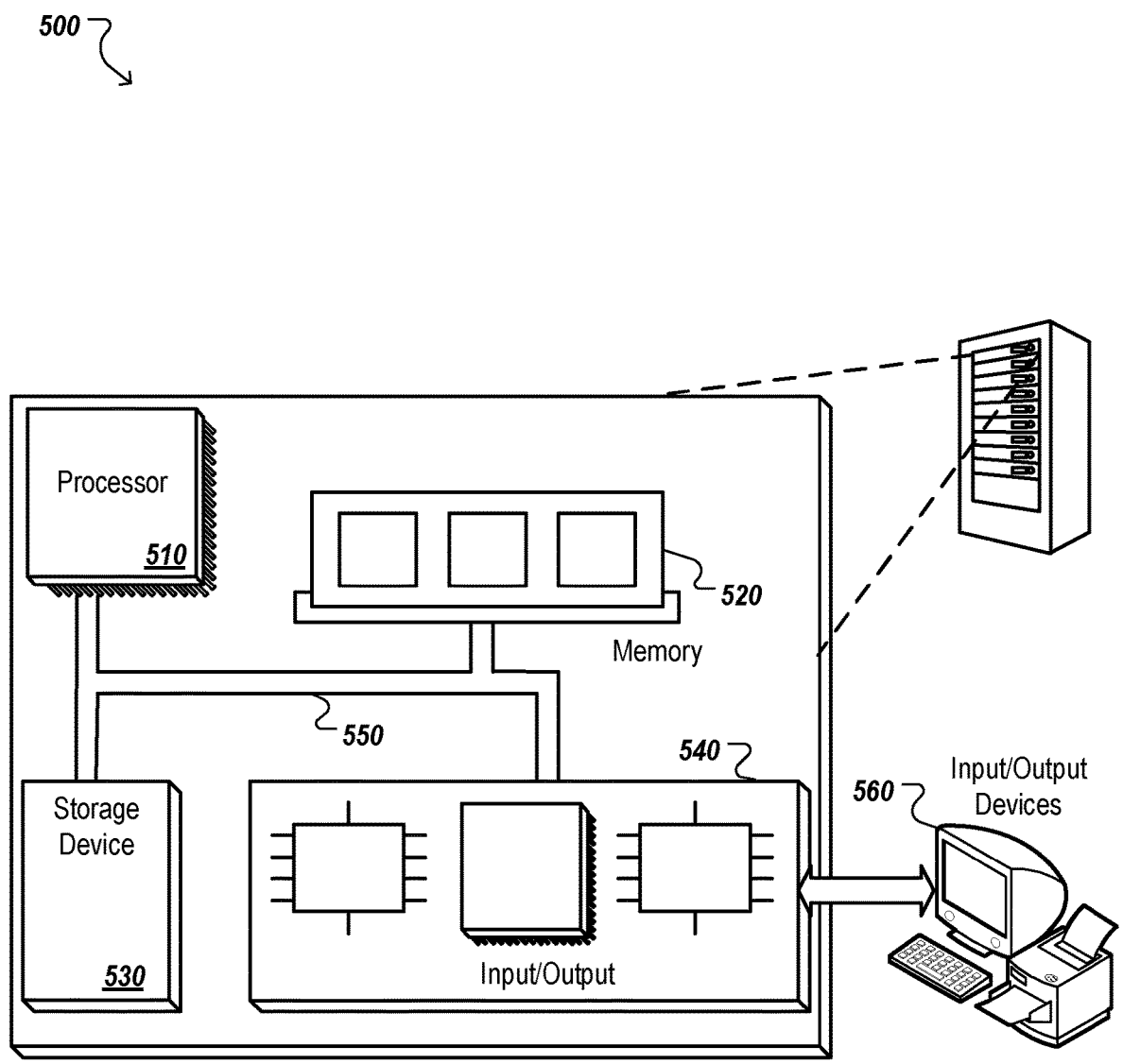
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
    receiving, by a data processing apparatus and from a client device, user data specifying one or more attributes of a user;
    generating, by the data processing apparatus, a unique entry for the user using the user data and a user identifier unique to the user;
    determining, by the data processing apparatus, that the unique entry is to be inserted into a probabilistic data structure based on at least one of: a false negative rate or a normalized probability for a value of a continuous value attribute, wherein the continuous value attribute is included among the one or more attributes;
    in response to determining that the unique entry is to be inserted into the probabilistic data structure based on at least one of the false negative rate or the normalized probability, inserting, by the data processing apparatus, a privacy enhanced representation of the unique entry into the probabilistic data structure that includes a plurality of privacy enhanced representations of unique entries for a plurality of users, including:
        generating, by the data processing apparatus, a hash representation of the unique entry;
        updating, by the data processing apparatus, the probabilistic data structure based on the hash representation;
    discarding, by the data processing apparatus, the user data after inserting the privacy enhanced representation of the unique entry into the probabilistic data structure;
    receiving a query requesting a response specifying how many users have an attribute that matches a given attribute specified in the query;
    obtaining, by the data processing apparatus and using the probabilistic data structure, a first number of users that includes both an estimated number of users that match the given attribute and false positives returned from the probabilistic data structure; and
    determining, by the data processing apparatus, the estimated number of users based on the first number of users and a false positive rate of the probabilistic data structure.

2. The computer implemented method of claim 1, wherein determining, by the data processing apparatus, the estimated number of users based on the first number of users and the false positive rate of the probabilistic data structure, including scaling, by data processing apparatus, the estimated number of users based on the false negative rate to obtain a scaled estimated number of users.

3. The computer implemented method of claim 2, further comprising:
    identifying, at random and using a specified percentage, one or more locations of the probabilistic data structure;
    updating values of the one or more locations of the probabilistic data structure; and
    scaling the scaled estimated number of users based on a number of the one or more locations.

4. The computer implemented method of claim 1, wherein:
    the continuous value attribute includes values ranging from a minimum value to a maximum value;
    the method further comprising:
        generating, by the data processing apparatus, the normalized probability for a value of the continuous value attribute that is proportional to the maximum value;
        receiving a query requesting an aggregate value of the continuous value attribute specified in the query;
        determining, by the data processing apparatus and using the probabilistic data structure, the aggregate value of the continuous value attribute specified in the query based on the estimated number of users and the maximum value.

5. The computer implemented method of claim 4, wherein:
    determining, by the data processing apparatus and using the probabilistic data structure, the aggregate value of the continuous value attribute specified in the query based on an estimated number of inserted users and the maximum value, including scaling the estimated number of inserted users using the maximum value to generate the aggregate value of the continuous value attribute.

6. The computer implemented method of claim 1, further comprising:
    determining, by the data processing apparatus, a date of receipt of the user data specifying the one or more attributes of the user;
    adjusting, by the data processing apparatus, data in the probabilistic data structure using data specifying the date of receipt of the user data;
    receiving a query requesting a response specifying how many users have an attribute that matches a particular attribute within a specified period;
    determining, using the probabilistic data structure, dates of receipt of the particular attribute for the estimated number of users; and
    identifying a number of users among the estimated number of users for which the respective date of receipt is within the specified period.

7. The computer implemented method of claim 6, further comprising:
discarding, by the data processing apparatus, data in the probabilistic data structure that is older than a predetermined period.

8. A system, comprising:
one or more memory devices storing instructions; and
one or more data processing apparatus that are configured to interact with the one or more memory devices, and upon execution of the instructions, perform operations including:
  receiving, from a client device, user data specifying one or more attributes of a user;
  generating a unique entry for the user using the user data and a user identifier unique to the user;
  determining, by the data processing apparatus, that the unique entry is to be inserted into a probabilistic data structure based on at least one of: a false negative rate or a normalized probability for a value of a continuous value attribute, wherein the continuous value attribute is included among the one or more attributes;
  in response to determining that the unique entry is to be inserted into the probabilistic data structure based on at least one of the false negative rate or the normalized probability, inserting a privacy enhanced representation of the unique entry into the probabilistic data structure that includes a plurality of privacy enhanced representations of unique entries for a plurality of users, including:
    generating a hash representation of the unique entry;
    updating the probabilistic data structure based on the hash representation;
  discarding the user data after inserting the privacy enhanced representation of the unique entry into the probabilistic data structure;
  receiving a query requesting a response specifying how many users have an attribute that matches a given attribute specified in the query;
  obtaining, using the probabilistic data structure, a first number of users that includes both an estimated number of users that match the given attribute and false positives returned from the probabilistic data structure; and
  determining the estimated number of users based on the first number of users and a false positive rate of the probabilistic data structure.

9. The system of claim 8,
wherein determining the estimated number of users based on the first number of users and the false positive rate of the probabilistic data structure, including scaling, by data processing apparatus, the estimated number of users based on the false negative rate to obtain a scaled estimated number of users.

10. The system of claim 9, wherein the one or more data processing apparatus are configured to perform operation further comprising:
identifying, at random and using a specified percentage, one or more locations of the probabilistic data structure;
updating values of the one or more locations of the probabilistic data structure; and
scaling the scaled estimated number of users based on a number of the one or more locations.

11. The system of claim 8, wherein:
the continuous value attribute includes values ranging from a minimum value to a maximum value;
wherein the one or more data processing apparatus are configured to perform operations further comprising:
  generating the normalized probability for a value of the continuous value attribute that is proportional to the maximum value;
  receiving a query requesting an aggregate value of the continuous value attribute specified in the query;
  determining, using the probabilistic data structure, the aggregate value of the continuous value attribute specified in the query based on the estimated number of users and the maximum value.

12. The system of claim 11, wherein determining, using the probabilistic data structure, the aggregate value of the continuous value attribute specified in the query based on an estimated number of inserted users and the maximum value, including scaling the estimated number of inserted users using the maximum value to generate the aggregate value of the continuous value attribute.

13. The system of claim 8, wherein the one or more data processing apparatus are configured to perform operations further comprising:
determining a date of receipt of the user data specifying the one or more attributes of the user;
adjusting data in the probabilistic data structure using data specifying the date of receipt of the user data;
receiving a query requesting a response specifying how many users have an attribute that matches a particular attribute within a specified period;
determining, using the probabilistic data structure, dates of receipt of the particular attribute for the estimated number of users; and
identifying a number of users among the estimated number of users for which the respective date of receipt is within the specified period.

14. The system of claim 13, wherein the one or more data processing apparatus are configured to perform operation further comprising discarding data in the probabilistic data structure that is older than a predetermined period.

15. A non-transitory computer readable medium storing instructions that, when executed by one or more data processing apparatus, cause the one or more data processing apparatus to perform operations comprising:
receiving, from a client device, user data specifying one or more attributes of a user;
generating a unique entry for the user using the user data and a user identifier unique to the user;
  determining, by the data processing apparatus, that the unique entry is to be inserted into a probabilistic data structure based on at least one of: a false negative rate or a normalized probability for a value of a continuous value attribute, wherein the continuous value attribute is included among the one or more attributes;
in response to determining that the unique entry is to be inserted into the probabilistic data structure based on at least one of the false negative rate or the normalized probability, inserting a privacy enhanced representation of the unique entry into the probabilistic data structure that includes a plurality of privacy enhanced representations of unique entries for a plurality of users, including:
generating a hash representation of the unique entry;
updating the probabilistic data structure based on the hash representation;
discarding the user data after inserting the privacy enhanced representation of the unique entry into the probabilistic data structure;

receiving a query requesting a response specifying how many users have an attribute that matches a given attribute specified in the query;

obtaining, using the probabilistic data structure, a first number of users that includes both an estimated number of users that match the given attribute and false positives returned from the probabilistic data structure; and determining the estimated number of users based on the first number of users and a false positive rate of the probabilistic data structure.

16. The non-transitory computer readable medium of claim 15, wherein determining the estimated number of users based on the first number of users and the false positive rate of the probabilistic data structure, including scaling, by data processing apparatus, the estimated number of users based on the false negative rate to obtain a scaled estimated number of users.

17. The non-transitory computer readable medium of claim 16, wherein the instructions cause the one or more data processing apparatus to perform operations further comprising:

identifying, at random and using a specified percentage, one or more locations of the probabilistic data structure;

updating values of the one or more locations of the probabilistic data structure; and scaling the scaled estimated number of users based on a number of the one or more locations.

18. The non-transitory computer readable medium of claim 15, wherein the continuous value attribute includes values ranging from a minimum value to a maximum value, wherein the instructions cause the one or more data processing apparatus to perform operations comprising:

generating the normalized probability for a value of the continuous value attribute that is proportional to the maximum value;

receiving a query requesting an aggregate value of the continuous value attribute specified in the query;

determining, using the probabilistic data structure, the aggregate value of the continuous value attribute specified in the query based on the estimated number of users and the maximum value.

19. The non-transitory computer readable medium of claim 18, wherein determining, using the probabilistic data structure, the aggregate value of the continuous value attribute specified in the query based on an estimated number of inserted users and the maximum value, including scaling the estimated number of inserted users using the maximum value to generate the aggregate value of the continuous value attribute.

20. The non-transitory computer readable medium of claim 15, wherein the instructions cause the one or more data processing apparatus to perform operations further comprising:

determining a date of receipt of the user data specifying the one or more attributes of the user;

adjusting data in the probabilistic data structure using data specifying the date of receipt of the user data;

receiving a query requesting a response specifying how many users have an attribute that matches a particular attribute within a specified period;

determining, using the probabilistic data structure, dates of receipt of the particular attribute for the estimated number of users; and identifying a number of users among the estimated number of users for which the respective date of receipt is within the specified period.

21. The non-transitory computer readable medium of claim 20, wherein the instructions cause the one or more data processing apparatus to perform operations further comprising discarding data in the probabilistic data structure that is older than a predetermined period.

* * * * *